United States Patent
Robertson, Jr. et al.

(10) Patent No.: US 6,764,788 B2
(45) Date of Patent: Jul. 20, 2004

(54) BATTERY COVER FOR CHARGING

(75) Inventors: William H. Robertson, Jr., Fort Lauderdale, FL (US); Wiling Tan, Penang (MY)

(73) Assignee: Motorola, Inc., Schaumburg, IL (US)

( * ) Notice: Subject to any disclaimer, the term of this patent is extended or adjusted under 35 U.S.C. 154(b) by 252 days.

(21) Appl. No.: 09/870,181

(22) Filed: May 30, 2001

(65) Prior Publication Data

US 2002/0182486 A1 Dec. 5, 2002

(51) Int. Cl.⁷ .............................. H01M 2/04; H01M 2/06
(52) U.S. Cl. ........................ 429/100; 429/97; 429/175
(58) Field of Search .......................... 429/96–100, 175; 320/107–115

(56) References Cited

U.S. PATENT DOCUMENTS

| 4,726,794 | A | * | 2/1988 | Narisue et al. ............. 439/752 |
| 5,633,096 | A | * | 5/1997 | Hattori ......................... 429/7 |
| 5,766,794 | A | * | 6/1998 | Brunette ...................... 429/97 |
| 5,917,306 | A |   | 6/1999 | Fischl |
| 6,045,936 | A |   | 4/2000 | Fischl |

* cited by examiner

Primary Examiner—Mark Ruthkosky
(74) Attorney, Agent, or Firm—Philip Burrus, IV

(57) ABSTRACT

This invention includes a cover for a rechargeable battery to facilitate charging. The invention provides a means for coupling a charging plug and battery having different mechanical form factors. Hence, when a battery is inserted into the cover, the charging plug may mechanically couple to the cover, allowing power terminals on the charging plug to engage charging contacts on the battery.

4 Claims, 2 Drawing Sheets

BATTERY COVER FOR CHARGING

BACKGROUND

1. Technical Field

This invention relates generally to rechargeable batteries and more specifically to the field of removable covers for rechargeable batteries.

2. Background Art

Many outdoorsmen use two-way radios to communicate. Most two-way radios, as well as many other portable electronic devices, employ rechargeable batteries as the primary power source. When the consumer buys a radio, there is generally a charger that mates to the radio. When the charger is coupled to the radio, the battery within begins charging.

Other radios include desktop stands in which the radio sits. These desktop stands generally include a form-fitted pocket for the radio. When the radio is placed in the pocket, the battery begins charging.

Often the shape, or "form-factor" of the radio is quite different from that of the radio. For example, the battery may be rectangular while the radio is rounded so as to fit in the hand more easily. Consequently, a charger or desktop stand designed to mate with the radio will not mate with the battery. If a user wants to charge two batteries, he must insert one in the radio and couple the radio to the charger or desktop stand. Once that battery is charged, he must remove it, insert the second battery into the radio, and couple the radio to the charger or desktop stand. This serial charging process is slow and tedious.

There is thus a need for a means of charging a battery without an electronic host device.

DETAILED DESCRIPTION OF THE INVENTION

Figure 1:
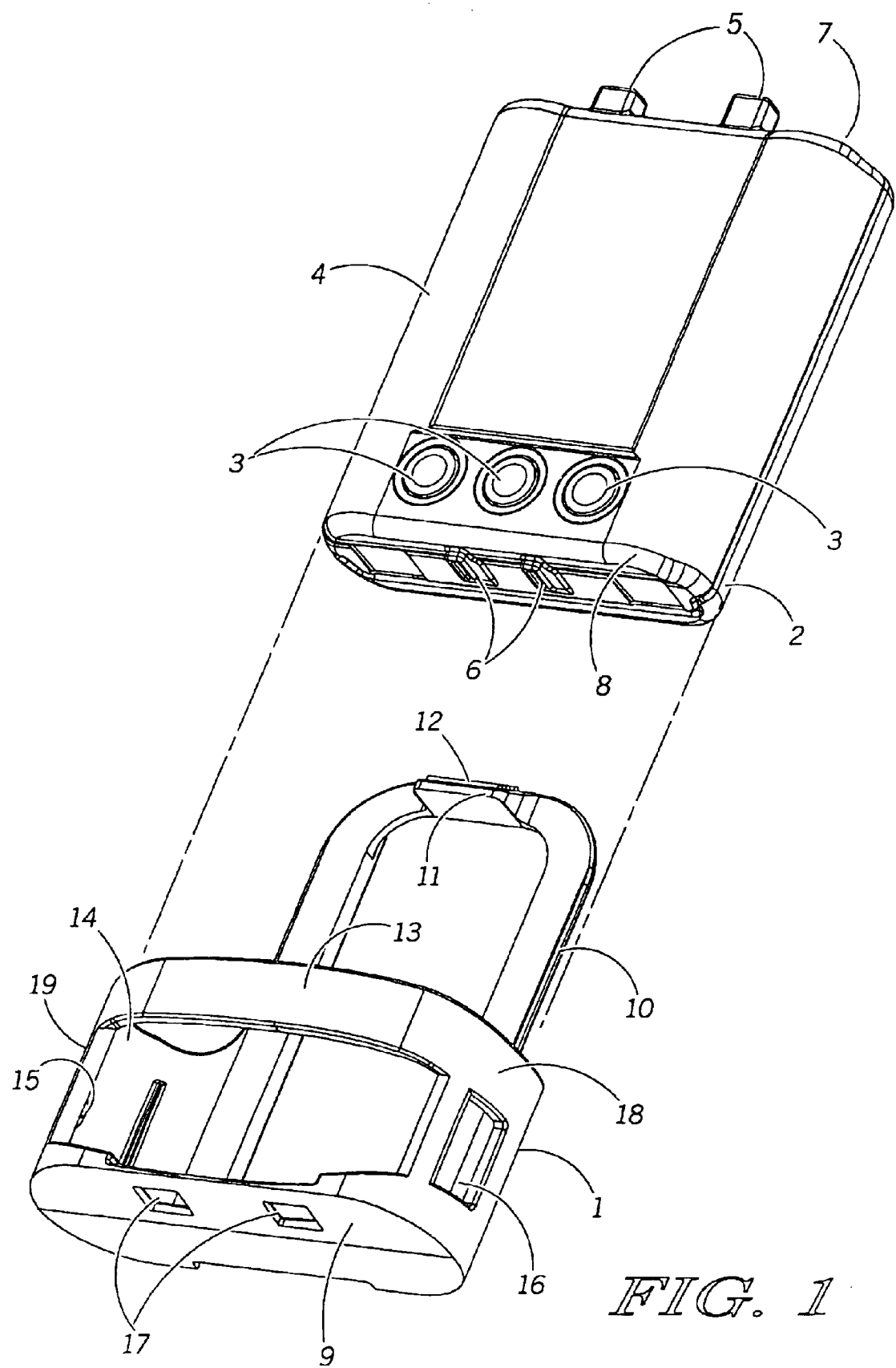
FIG. 1 is an illustration of one embodiment of a battery and charging cover in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a cover 1 for a battery 2. The battery 2 has a housing 4 having a top part 7 and a bottom part 8. The housing 4 has charging contacts 3 disposed thereon. The housing 4 also includes optional mating prongs 5,6. In one embodiment, the housing 4 includes a first set of mating prongs 6 disposed on the bottom part 8.

The cover 1 comprises a base 9, a back 10, a first side 18, a second side 19, and a belt 13. Attached to the back is a latch 11 having optional finger ridges 12 for ease of use. The belt 13, in combination with the first side 18, the left side 19 and the base 9 circumscribe a main orifice 14. The first side 18 includes a first orifice 16, and the second side 19 includes a second orifice 15. The cover 1 is designed such that the battery 2 may be inserted into the cover 1. Upon insertion, the latch 11 will couple with the top part of the battery 7, the base 9 will couple with the bottom part of the battery 8 and the belt 13 will wrap about the housing 4. When the optional first set of mating prongs 6 are included on the battery housing 2, the cover may include a set of mating receptacles 17 to assure a proper fit.

The cover 1 may be manufactured by any number of manufacturing processes, including injection molding. The cover may be made from any number of materials, including plastics, styrene, acrylic, polycarbonates, resins, rubber, or other compounds.

Figure 2:
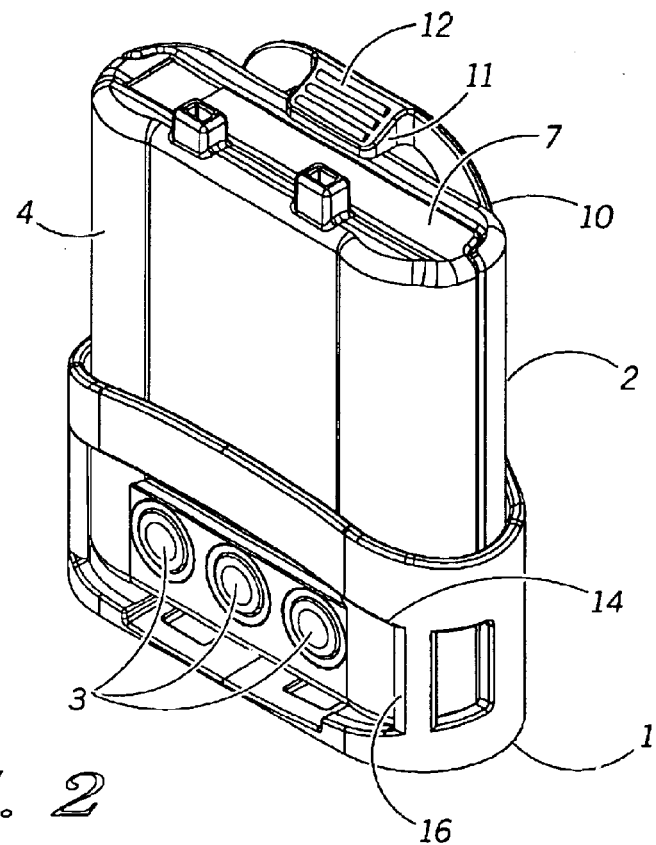
FIG. 2 is an illustration of a battery inserted in a charging cover in accordance with the invention.

Referring now to FIG. 2, illustrated therein is the battery 2 inserted into the cover 1. During the insertion process, the back, being manufactured from a flexible material like plastic, deflects in a cantilever motion to allow the latch 11 to move about the battery housing and engage the top part 7. Likewise, to disengage the latch 11 and remove the battery 2 from the cover 1, one simply places a finger on the finger ridges 12 and depresses the latch away from the battery 2, causing the back 10 to again deflect with a cantilever motion. Once the back 10 is deflected, the battery 2 can be easily removed.

When the battery 2 is inserted into the cover 1, the charging contacts 3 are exposed through the main orifice 14. This exposure is critical to the invention, as the first orifice 16 and the second orifice (not shown) enable a charging plug to be coupled to the charging contacts 3 through the main orifice 14.

Figure 3:
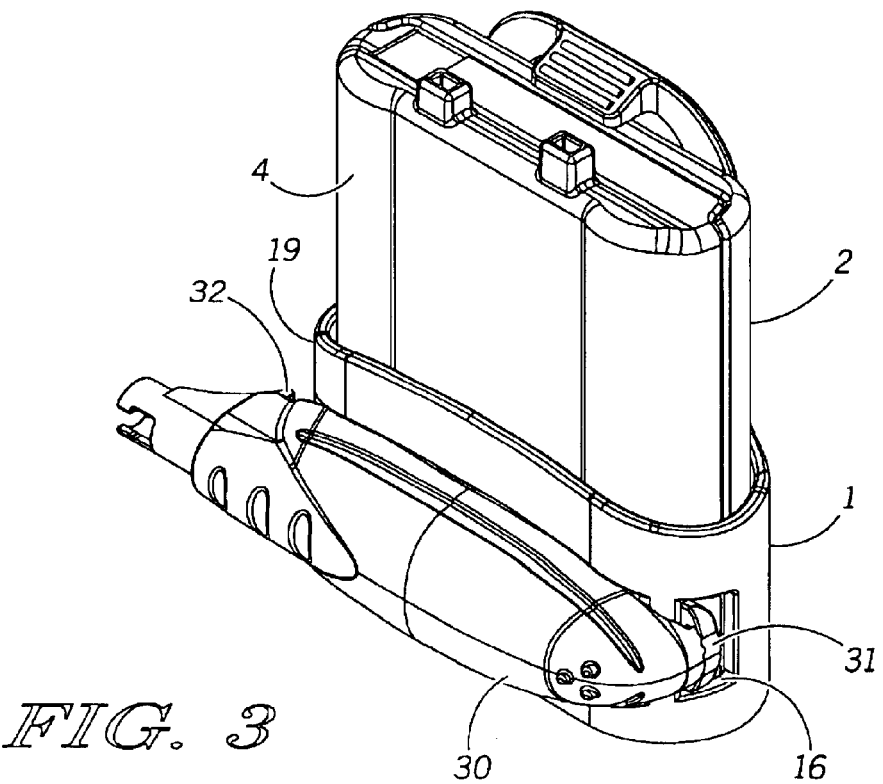
FIG. 3 is an illustration of a charging device coupled to a battery inserted in a charging cover in accordance with the invention.

Referring now to FIG. 3, illustrated therein is a charging plug 30 coupled to the cover 1 via the first orifice 16 and the second orifice (not shown). The charging plug has a first hook 31 that engages with the first orifice 16. The charging plug has a second hook that engages with the second orifice in a likewise manner. The second hook is coupled to a thumb lever 32 so that it may be deflected with a cantilever motion. To couple the charging plug 30 to the cover 1, one inserts the first hook 31 in the first orifice 16. The mechanical interface between the first hook 31 and the first orifice 16 work as a fulcrum about which the charging plug 30 may be rotated. By rotating the charging plug 30 towards the cover 1, the second hook deflects about the second side 19 until it snaps into the second orifice. The charging plug 30 is removed by placing a finger on the thumb lever 32 and deflecting the second hook out of the second orifice while pulling the charging plug 30 away from the cover.

The charging plug 30 has power terminals disposed thereon in a mirror image to the charging contacts. The power terminals may be spring loaded so as to ensure a low-impedance electrical connection when the charging plug is coupled to the cover 1. When the charging plug 30 is coupled to the cover 1 with a battery 2 inserted, the power terminals mate electrically with the charging terminals to charge the battery. Charging circuitry may be disposed in a power supply that is coupled to the charging plug 30 via a wire or cable.

Thus, the invention allows charging of a battery without the need of a desktop stand or other electronic device. It allows a charging plug having mechanical contacts which are not compatible with the mechanical form factor of a battery to successfully couple electrically with the battery, thereby enabling the charging process.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one embodiment of the cover has been illustrated as having three orifices, any number of ridges, orifices may be needed to accommodate the wide variety of charging plugs that abound today.

What is claimed is:

1. A detachable for a battery, the cover comprising mechanical features suitable for mating to a charging plug, wherein the cover comprises at least aperture for receiving a battery and at least a main orifice, such that at when the battery is inserted into the cover, at least one charging terminal of the battery is exposed through the at least a main orifice, wherein the cover comprises a base, a first side, a second side, a back, a latch and a belt.

2. The cover of claim 1, wherein the cover further comprises a latch mounted on the back, such that the latch facilitates deflection of the back in a cantilever fashion.

3. The cover of claim 2, wherein a first orifice is capable of mating to a charging plug having at least one hook.

4. The cover of claim 3, wherein the cover is made of a material selected from the group consisting of plastics, styrene, acrylic, polycarbonates, resins, and rubber.

* * * * *